3,589,981
Patented June 29, 1971

3,589,981
**METHOD OF MAKING 3B-HYDROXY-
$\Delta^{5(10)}$-STEROIDS**
Hans-Detlef Berndt, Wolfgang Koch, Klaus Kieslich, Rudolf Wiechert, and Hans-Joachim Koch, Berlin, Germany, assignors to Schering AG, Berlin, Germany
No Drawing. Filed July 8, 1968, Ser. No. 743,256
Claims priority, application Germany, July 7, 1967, Sch 40,978; Nov. 1, 1967, P 16 43 051.6
Int. Cl. C07c *167/00*
U.S. Cl. 195—51       9 Claims

ABSTRACT OF THE DISCLOSURE

3β-hydroxy-$\Delta^{5(10)}$-steroids of the pregnane and androstane series are produced by microbiological reduction of 3-keto-$\Delta^{5(10)}$-steroids of the pregnane or androstane series with microorganisms or enzymes isolated therefrom.

BACKGROUND OF THE INVENTION

The present invention is concerned with a method for producing 3β-hydroxy-$\Delta^{5(10)}$-steroids of the pregnane and androstane series by subjecting 3-keto-$\Delta^{5(10)}$- or 3-alkoxy-$\Delta^{2,5(10)}$-steroids to reaction with microorganisms or enzymes isolated therefrom. The reduction of a 3-keto group to a 3-hydroxyl group has been described previously. However, according to all published chemical methods for this purpose, compounds are obtained in which the 3-OH-group is a mixture of 3β- and 3α-isomers with the predominant proportion of the 3α-isomers. It is also known that microbiological reduction of a 3-keto group in the additional presence of a double bond, for instance in the case of 3-keto-$\Delta^{1}$-, 3-keto-$\Delta^{1,4}$- or 3-keto-$\Delta^{5}$-steroids, will cause, in addition to the microbiological reduction of the keto group, also simultaneous partial or complete enzymatic hydrogenation of such double bond.

The reduction of 3-keto-$\Delta^{5(10)}$-steroids has been described up to now only as being carried out with complex metal hydrides, for instance by S. G. Levin, J. Org. Chem. 31, 3995 (1966), whereby, however, the corresponding 3α-hydroxy-$\Delta^{5(10)}$-steroid was formed as the main reaction product.

SUMMARY OF THE INVENTION

The present invention is concerned with a method of producing 3β-hydroxy-$\Delta^{5(10)}$-steroids of the pregnane and androstane series by reacting 3-keto-$\Delta^{5(10)}$-steroids of the pregnane or androstane series with microorganisms or enzymes isolated therefrom so as to achieve a microbiological reduction of the 3-keto-$\Delta^{5(10)}$-steroids.

Suitable starting products include 3β-alkoxy-$\Delta^{2,5(10)}$-steroids.

The suitable microorganisms broadly encompass bacteria, fungi and yeasts (or the enzymes isolated therefrom).

More specifically, good results are obtained according to the present invention by subjecting the starting steroids to reaction with the following groups of microorganisms or enzymes obtained therefrom: *Bacillus esterificans, Bacillus laterosporus, Flavobacterium arborescens, Flavobacterium flavescens, Flavobacterium suaveolens,* and *Proteus vulgaris;* yeasts of the groups candida. Rhodotorula and Pichia; and fungi of the groups *Aspergillus fischeri, Clastosporium maydicum, Cylindrocarpon radicicola, Dothichiza feroginosa, Gibberella cyanea, Fusarium javanicum, Fusarium solani, Melanconium shacchari, Penicillium albidum, Penicillium digitatum, Penicillium notatum, Phyllosticta sojaecola, Septomyxa affinis* and *Sporidesmium bakeri.*

The method of the present invention may be carried out for producing 3β-hydroxy-$\Delta^{5(10)}$-steroids of the pregnane and androstane series which contain in one or more of the 6-, 11-, 16-, 17-, 20- and 21-positions a hydroxyl group, whereby the hydroxyl group may be a free or esterified hydroxyl group, and which steroids furthermore may contain in the 6-, 7-, 16-, 17- and/or 18-positions an alkyl group, preferably a lower alkyl group with up to 5 carbon atoms. Or, the steroids may also contain in 17-position an ethinyl group, in 17- or 20-position a keto group and in 16,17-position a cyclomethylene residue group. In these cases, the microorganisms or the enzymes isolated therefrom are permitted to react with corresponding 3-keto-$\Delta^{5(10)}$-steroids.

DESCRIPTION OF THE PREFERRED EMBODIMENTS

As briefly pointed out above, the present invention is concerned with a method for producing 3β-hydroxy-$\Delta^{5(10)}$-steroids of the pregnane and androstane series by subjecting 3-keto-$\Delta^{5(10)}$- or 3-alkoxy-$\Delta^{2,5(10)}$-steroids to reaction with microorganisms or enzymes isolated therefrom.

The starting materials for the process of the present invention may contain in addition to the 3-keto-$\Delta^{5(10)}$- or 3-alkoxy-$\Delta^{2,5(10)}$-groups, also additional substituents in the molecule, such as free or esterified hydroxyl groups in the 1-, 6-, 11-, 14-, 16-, 17-, 20- and/or 21-position, and/or, preferably lower, alkyl groups in the 1-, 2-, 4-, 6-, 7-, 15-, 16-, 17- and/or 18-position, and/or a cyclomethylene residue for instance in the 1,2-, 6,7-, 15,16- and/or 16,17-position.

If as starting materials for the method of the present invention 3-alkoxy-$\Delta^{2,5(10)}$-steroids, preferably 3-methoxy-$\Delta^{2,5(10)}$-steroids are used, the method will cause the microbiological splitting of an enolic ether (primary reaction) with simultaneous reduction of the 3-keto group which has been freed thereby (secondary reaction).

The microbiological splitting of enolic ether appears to be a novel type of enzymatic reactions.

The microbiological conversion of 3-keto-$\Delta^{5(10)}$- or 3-alkoxy-$\Delta^{2,5(10)}$-steroids to the technically valuable 3β-hydroxy-$\Delta^{5(10)}$-steroids is surprising and was unforeseeable since it is known that a $\Delta^{5(10)}$-double bond may be easily isomerized in conjugation to a simultaneously present 3-keto group, not only by the effect of chemical reactants but also by enzymatic treatment [F. S. Kawahara et al., J. Biol. Chem. 237, 1500 (1962)].

With respect to their substituents, the products obtained in accordance with the present invention correspond to the respective starting products. During the reaction of the present invention, it is only achieved that the 3-keto group or the 3-alkoxy group (if the starting material is a $\Delta^{2}$-3-alkoxy ether) will be converted into a 3β-OH group. The only further consideration is that an additional keto group in the molecule may possibly also be reduced to a hydroxyl group.

Irrespective of utilizing 3-keto-$\Delta^{5(10)}$- or 3-alkoxy-$\Delta^{2,5(10)}$-starting materials, the reaction of the present invention may be carried out with bacteria, fungi and yeasts, however, for the reaction of 3-alkoxy-$\Delta^{2,5(10)}$-steroids, fungi and yeasts are preferred.

The products obtained according to the present invention are technically valuable intermediates or starting products for the introduction of a 19-methyl group, for instance by means of the well-known Simmons-Smith reaction. It is not possible to utilize the corresponding 3α-hydroxy-$\Delta^{5(10)}$- or 3-keto-$\Delta^{5(10)}$-steroids as the starting steroids for the introduction of the 19-methyl group, since by carrying out the Simmons-Smith reaction with the last-mentioned starting materials only compounds with an undesirable 10α-methyl structure would be obtained. The products presently mentioned are intermediates for producing such effective steroids which contain a methyl group at $C_{10}$. For this purpose only such starting materials may be used which, in addition to the $\Delta^{5(10)}$-double bond possess the 3-position hydroxyl group in β-position. The introduction of the methyl group in 10-position is then carried out according to the Simmons-Smith reaction, i.e. the $\Delta^{5(10)}$-double bond is reacted with methylene iodide in the presence of zinc-copper in a suitable solvent. Thereafter, the 3β-OH- group is oxidized and the 5(10)-methylene ring which was formed by the Simmons-Smith reaction is split, for instance with HCl in glacial acetic acid, so that finally the desired 3-keto-$\Delta^4$-grouping is formed.

The microbiological reduction of the 3-keto group is carried out in accordance with conventional methods known to those skilled in the art.

First, in conventional preliminary tests, the optimum reaction conditions are determined, such as the choice of the microorganism which is particularly suitable in connection with the chosen substrate, and the length of time during which fermentation should be carried out. These preliminary tests include analytical determinations, preferably by thin layer chromatography.

For producing the desired end product, the microorganism which had been chosen in the preliminary tests is then introduced into the nutrient solution and propagated therein submersed under aerobic conditions. After propagation has been reached to the desired value, the substrate, i.e. the steroid which has to be subjected to microbiological reduction is added in the form of a solution or suspension.

The now proceeding fermentation is preferably controlled by means of thin layer chromatography. After completion of the fermentation, the reaction product is extracted from the fermentation broth by means of a suitable, water-immiscible, organic solvent, and the reaction product is then isolated from the thus formed extract, for instance by evaporation and further purification in per se conventional manner such as recrystallization and/or chromatographic isolation on silica gel.

Suitable microorganisms for carrying out the above-described process are bacteria, fungi, and particularly yeasts, or enzymes isolated from these microorganisms. Preferred are, for instance, yeasts of the genus Candida, such as *Candida tropicalis, Candida zeylanoides* or *Candida krusei* or also yeasts of the genus Rhodotorula, such as *Rhodotorula glutinis*.

As pointed out above, bacteria, fungi and yeasts, or enzymes thereof, may be utilized. However, if 3-alkoxy-$\Delta^{2,5(10)}$-steroids are used as starting material, fungi and yeasts are preferred.

The following examples are given as illustrative only without, however, limiting the invention to the specific details of the examples.

EXAMPLE 1

(a) Several Erlenmeyer flasks each having a capacity of 3 liters are used.

Into each of these flasks is introduced one liter of a nutrient solution containing 0.1% peptone, 0.2% corn steep liquor, 0.5% glucose and 0.5% yeast extract and adjusted to a pH of between 7.0 and 7.2. Thereafter, the thus partially filled flasks are sterilized in an autoclave at 120° C. for a period of 30 minutes.

Thereafter, the flask contents are inoculated with a rinsing of an inclined agar culture of Bacillus esterificans (Biologische Bundesanstalt, Berlin) and the inoculated flasks are then shaken for 24 hours on a rotating shaking device at a frequency of 145 turns per minute while being maintained at a temperature of 30° C.

Portions of 100 ml. each of this preculture serve for inoculating 4 similarly prepared flasks, into each of which after shaking for 4 hours 150 mg. 5(10)-estrene-17β-ol-3-on, dissolved in 1.0 ml. dimethylformamide, are introduced.

After further shaking for 44 hours, the fermentation broths are twice extracted with 500 ml. methylisobutyl-ketone each, and the extracts are evaporated in vacuo. 5(10)-estrene-3β,17β-diol ($R_F$-value 0.36) are isolated from the thus obtained crude products by thin layer chromatography on silica gel PF (E. Merck AG, Darmstadt) by development with isopropylether-amylalcohol (95:5) and elution of the corresponding zone with methanol.

A similar reaction can be carried out in analogous manner with *Bacillus laterosporous* (ATCC 4517), *Flavobacterium arborescens* (ATCC 4358), *Flavobacterium flavescens* (ATCC 8315), *Flavobacterium suaveolens* (ATCC 958) or *Proteus vulgaris* (Biologische Bundesanstalt, Berlin).

(b) Under the conditions described in Example (a) but utilizing a nutrient solution containing 3% glucose, 1.0% corn steep liquor, 0.2% $NaNO_3$, 0.05% KCl, 0.1% $KH_2PO_4$, 0.2% $K_2HPO_4$, 0.05% $MgSO_4$, 0.002% $FeSO_4$, fermentation of 5(10)-estrene-17β-ol-3-on with *Aspergillus fischeri* (ATCC 1020), *Clastosporium maydicum* (CBS), *Cylindrocarpon radicicola* (ATCC 11011), *Dothichiza feroginosa* (ATCC 11918), *Gibberella cyanea* (CBS), *Fusarium javanicum* (CBS), *Fusarium solani* (ATCC 11792), *Melanconium sacchari* (CBS), *Penicillium albidum* (CMI 40290), *Penicillium digitatum* (CBS), *Penicillium notatum* (ATCC 9478), *Phyllosticta sojaecola* (CBS), *Septomyxa affinis* (ATCC 6737) or *Sporidesmium bakeri* (CBS) will permit the isolation of 5(10)-estrene-3β,17β-diol.

(c) Again following the general conditions described in Example 1(a) but utilizing a nutrient solution containing 5.0% glucose, 2.0% corn steep liquor, pH 6.5, for fermenting 5(10)-estrene-17β-ol-3-on, with *Candida albicans* (Schering M 11 E), *Candida brumptii* (Schering M 13 B), *Candida guilliermondii* (Schering M 7 D), *Candida krusei* (ATCC 6258, NCYC 329, 332, 337, 338, 562), *Candida claussenii* (Schering M 11 B), *Candida melibiosi* (Schering M 7 C), *Candida mycoderma* (NCYC 335), *Candida pelliculosa* (NCYC 471), *Candida pulcherrima* (Schering M 11 A), *Candida reukaufii* (Schering M 9 E), *Candida rugosa* (NCYC 391), *Candida scottii* (Schering M 3 C), *Candida stellatoidea* (ATCC 11006), *Candida tropicalis* (ATCC 750, NCYC 4, 5, 405, 470), *Candida tropicalis* St. Monilia H (Inst. für Gärungsgewerbe, Berlin), *Candida zeylanoides* (Schering M 9 F), *Debariomyces kloeckeri* (NCYC 8), *Pichia fermentans* (NCYC 246), *Rhodotorula glutinis* var. *gracilis* St. Riendl 21 (Inst. für Gärungsgewerbe, Berlin), *Rhodotorula glutinis* var. *rubescens* (NCYC 61), *Rhodotorula graminis* (NCYC 502), *Rhodotorula minuta* (NCYC 62), *Rhodotorula mucilaginosa* (NCYC 63) or *Rhodotorula rubra* (NCYC 142).

EXAMPLE 2

Preparation of $\Delta^{5(10)}$-estrene-3β,17-diol

A nutrient solution consisting of 5% glucose and 2% corn steep liquor is introduced into a 3 liter Erlenmeyer flask and sterilized at 120° C. The sterilized solution is inoculated with a rinsing of an oblique agar culture of *Candida tropicalis* St. Monilia H (Inst. fuer Gaerungsgewerbe, Berlin) and is thereafter shaken for 1 day at 30° C. at a shaking frequency of 145 per minute. This preculture is employed to inoculate a 50 l. fermenting vessel containing 29 l. of a sterilized medium of similar composition and following the addition of silicon oil SH as an anti-foaming agent is fermented under aeration (1.65 m.³/h.) and stirring (220 r.p.m.). After 24 hours' running time, 1.8 l. of thus obtained culture are transferred under sterile conditions to a similarly constructed fermenting vessel and the fermentation is continued therein under identical conditions.

After a running time of 8 hours, 6.0 g. $\Delta^{5(10)}$-estrene-17β-ol-3-on, dissolved in 200 ml. dimethylformamide, are added and the fermentation continued. Following the addition of the substrate, the amount of air introduced is reduced to one-half, the stirrer is stopped, and the fermentation is continued under these conditions for another 35 hours. Thereafter, the contents of the fermenting vessel are extracted with 15 l. of methylisobutylketone and then again with a further 10 l. of methylisobutylketone. The extract is thereafter evaporated in vacuo at a bath temperature of 50° C. The oily crude product is subjected to chromatography using therefor a mixture of hexane and acetone on silica gel 10% deactivated with water under gradient elution and thereafter crystallized out of hexane/acetone. There is thus obtained, in 36% yield, $\Delta^{5(10)}$-estrene-3$\beta$,17$\beta$-diol having a melting-point of 149–150° C.; UV: $\epsilon_{192}$=6,320.

EXAMPLE 3

Under the same conditions as given in Example 2, $\Delta^{5(10)}$-estrene-3$\beta$,17$\beta$-diol is prepared by fermentation using *Rhodotorula glutinis* St. gracilis Reindl 21 (Inst. fuer Gaerungsgewerbe, Berlin).

EXAMPLE 4

Analogously to Example 2, a 50% yield of $\Delta^{5(10)}$-estrene-3$\beta$,17$\beta$-diol is prepared by fermentation using *Candida krusei* (ATCC 6258).

EXAMPLE 5

According to the procedure described in Example 2, $\Delta^{5(10)}$-estrene-3$\beta$,17$\beta$-diol is prepared by fermentation with *Candida zeylanoides*.

EXAMPLE 6

Under the conditions described in Example 2, 17$\alpha$-methyl-$\Delta^{5(10)}$-estrene-17$\beta$-ol-3-on is fermented to provide 17$\alpha$-methyl-$\Delta^{5(10)}$-estrene-3$\beta$,17$\beta$-diol, having a melting-point of 162.5–164° C.; UV: $\epsilon_{194}$=7,120.

EXAMPLE 7

Under the conditions described in Example 2, 17$\alpha$-ethinyl-$\Delta^{5(10)}$-estrene-17$\beta$-ol-3-on is fermented to yield 17$\alpha$-ethinyl-$\Delta^{5(10)}$-estrene-3$\beta$,17$\beta$-diol. Melting point: 132–135° C. UV: $\epsilon_{192}$=10,500.

EXAMPLE 8

Analogously to Example 2, 18-methyl-$\Delta^{5(10)}$-estrene-3$\beta$,17$\beta$-diol is prepared by fermentation of 18-methyl-$\Delta^{5(10)}$-estrene-17$\beta$-ol-3-on. Melting point: 160–162.5° C. UV: $\epsilon_{194}$=9,600.

EXAMPLE 9

Following the procedure given in Example 2, $\Delta^{2(10)}$-estrene-3$\beta$-ol-17-on, having a melting point of 129–130° C., is prepared by fermentation of $\Delta^{5(10)}$-estrene-3,17-dion. In addition, there is isolated $\Delta^{5(10)}$-estrene-3$\beta$,17$\beta$-diol.

EXAMPLE 10

Analogously to Example 2, $\Delta^{5(10)}$-estrene-3$\beta$,17$\beta$-diol-17-acetate, having a melting point of 110–112° C., is obtained by fermentation of $\Delta^{5(10)}$-estrene-17$\beta$-ol-3-on-17-acetate.

EXAMPLE 11

Under the conditions described in Example 2, 19-nor-$\Delta^{5(10)}$-pregnene-3$\beta$-ol-20-on, having a melting point of 139–140.5° C., is obtained by fermentation of 19-nor-$\Delta^{5(10)}$-pregnene-3,20-dion.

EXAMPLE 12

Following the procedure of Example 2, 15,16$\beta$-methylene-$\Delta^{5(10)}$-estrene-3$\beta$,17$\beta$-diol, having a melting point of 158–159° C., is obtained by fermentation of 15,16$\beta$-methylene-$\Delta^{5(10)}$-estrene-17$\beta$-ol-3-on with *Pichia fermentans* (NCYC 246).

EXAMPLE 13

Under the conditions as given in Example 2, 7$\alpha$-methyl-$\Delta^{5(10)}$-estrene-3$\beta$,17$\beta$-diol, having a melting point of 165–167° C., is prepared by fermentation of 7$\alpha$-methyl-$\Delta^{5(10)}$-estrene-17$\beta$-ol-3-on with *Pichia fermentans* (NCYC 246).

EXAMPLE 14

Following the procedure of Example 2, $\Delta^{5(10)}$-estrene-3$\beta$,16$\alpha$,17$\beta$-triol having a melting point of 203–205° C. is prepared by fermentation of $\Delta^{5(10)}$-estrene-16$\alpha$,17$\beta$-diol-3-on with *Pichia fermentans* (NCYC 246).

EXAMPLE 15

Under the conditions recited in Example 2, $\Delta^{5(10)}$-pregnene-3$\beta$,20$\beta$-diol is obtained, having a melting point of 158–159° C., by fermentation of $\Delta^{5(10)}$-pregnene-20$\beta$-10-3-on using *Pichia fermentans* (NCYC 246).

EXAMPLE 16

(a) Under the conditions described in Example 2, $\Delta^{5(10)}$-pregnene-3$\beta$,17$\alpha$,20$\beta$-triol is obtained, having a melting point of 184–185° C., by fermentation of $\Delta^{5(10)}$-pregnene-17$\alpha$-ol-3,20-dion with *Pichia fermentans* (NCYC 246). In addition, there is isolated as an intermediate product, in crude form, $\Delta^{5(10)}$-pregnene-3$\beta$,17$\alpha$-diol-20-on using therefor column chromatography of the mother liquor.

(b) The fermentation is also carried out with *Candida tropicales* St. Monilia H (Inst. für Gärungsgewerbe, Berlin), whereby there is obtained as the sole product $\Delta^{5(10)}$-pregnene-3$\beta$,17$\alpha$-20$\beta$-triol, having a melting point of 185–188° C.

EXAMPLE 17

Under the conditions given in Example 2, $\Delta^{5(10)}$-estrene-3$\beta$,11$\alpha$,17$\beta$-triol, having a melting point of 204–205° C., is obtained by fermentation of $\Delta^{5(10)}$-estrene-11$\alpha$,17$\beta$-diol-3-on with *Pichia fermentans* (NCYC 246).

EXAMPLE 18

Analogously to Example 2, there is obtained $\Delta^{5(10)}$-estrene-3$\beta$,6$\beta$,17$\beta$-triol, having a melting point of 191–195° C. $[\alpha]_D^{25}$=+153° (methanol), by fermentation of $\Delta^{5(10)}$-estrene-6$\beta$,17$\beta$-diol-3-on (prepared by the 6-desoxy linkage through microbiological hydroxylation with *Aspergillus ochraceus* using *Pichia fermentans* (NCYC 246).

EXAMPLE 19

(a) Into each of several Erlenmeyer flasks, each having a capacity of 3 l., is introduced 1 l. of a nutrient solution composed of 3% glucose, 1.0% corn steep liquor, 0.2% $NaNO_3$, 0.05% KCl, 0.1% $KH_2PO_4$, 0.2% $K_2HPO_4$, 0.05% $MgSO_4$, 0.002% $FeSO_4$, and the flasks are sterilized in an autoclave at 120° C. for a period of 30 minutes. The flasks are then inoculated with a rinsing of an oblique agar culture of *Aspergillus fischeri* (ATCC 1020) and are shaken for 24 hours at 30° C. on a rotating shaking device having a frequency of 145 per minute. 100 ml. each of this preculture are then used for the inoculation of 4 similarly prepared flasks, to each of which, after a shaking time of 4 hours, there are added 150 mg. 2,5(10)-estradiene-3,17$\beta$-diol-3-methylether dissolved in 1.0 ml. dimethylformamide. Following a further shaking time of 44 hours, the fermentation broths are twice extracted with 500 ml. methylisobutylketone and the extracts are evaporated in vacuo. From the thus obtained crude products there is isolated by preparatory thin-layer chromatography on silica gel PF (Merck AG, Darmstadt) under development with isopropylether-amylalcohol (95:5) and elution of the corresponding zone with methanol, 5(10)-estrene-3$\beta$,17$\beta$-diol (R$_F$-value 0.36). Similar reactions can be carried out with *Fusarium solani* (ATCC 11712) and *Penicillium digitatum* (CBS).

(b) Under the conditions given in Example 19(a), there is isolated 5(10)-estrene-3$\beta$,17$\beta$-diol by utilization of a nutrient solution consisting of 5.0% glucose, 2.0% corn steep liquor having a pH 6.5, following fermentation of 2,5(10)-estradiene-3,17$\beta$-diol-3-methylether with *Candida albicans* (Schering M 11 E0, *Candida brumptii*

(Schering M 13 B), *Candida claussenii* (Schering M 11 B), *Candida guilliermondii* (Schering M 7 D), *Bandida krusei* (ATCC 6258, NCYC 329, 332, 337, 338, 562), *Bandida melibiosi* (Schering M 7 C), *Candida mycoderma* (NCYC 335, *Bandida pelliculosa* (NCYC 471), *Candida scottii* (Schering M 3 C0), *Candida stellatoidea* (ATCC 11006), *Candida tropicalis* (ATCC 750, NCYC 4, 5, 405, 470), *Candida tropicalis* St. Monilia H. (Inst. fuer Gaerungsgewerbe, Berlin), *Candida zeylanoides* (Schering M 9 F), *Debariomyces kloeckeri* (NCYC 8), *Pichia fermentans* (NCYC 246), *Rhodotorula glutinis* var. *gracilis* St. Reindl 21 (Inst. fuer Gaerungsgewerbe, Berlin), *Rhodotorula mucilaginosa* (NCYC 63) or *Rhodotorula rubra* (NCYC 142).

EXAMPLE 20

A 3 l. Erlenmeyer flask, containing 1 l. of a nutrient solution, consisting of 5% glucose and 2% corn steep liquor, which has been sterilized at 120° C., is inoculated with a rinsing of an oblique agar culture of *Candida tropicalis* St. Manilia H (Inst. fuer Gaerungsgewerbe, Berlin). The flask is then shaken for 1 day at 30° C. with a shaking frequency of 145 per minute. This preculture is used to inoculate a 50 l. fermenting vessel containing 29 l. of a sterilized medium of identical composition, and following the addition of silicon oil as anti-foaming agent, the latter is fermented at 29° C. while being aerated (1.65 m.³/h.) and stirred (220 r.p.m.). After a running time of 24 hours, 1.8 l. of the thus obtained culture are transferred under sterile conditions to a similarly arranged fermentation vessel and fermented therein under identical conditions. After a running time of 8 hours, there are added 6.0 g. 2,5(10)-estradiene-3,17$\beta$-diol-3-methylether dissolved in 200 ml. dimethylformamide, and the fermentation is continued. After the addition of the substrate, the amount of air introduced is reduced by one-half, the stirrer is shut off, and the fermentation is continued for another 35 hours. Thereafter, the vessel contents are extracted with 15 l., and again with 10 l., of methylisobutylketone and the extract is evaporated in vacuo at a bath temperature of 50° C. The oily crude product is subjected to chromatography on silica gel 10% deactivated with water under gradient elution with a mixture of hexane and acetone and thereafter crystallized from hexane/acetone. There is thus obtained, in a 30% yield, $\Delta^{5(10)}$-estrene 3$\beta$,17$\beta$-diol having a melting point of 148–150° C. and UV: $\epsilon_{192}$=6,320.

EXAMPLE 21

Analogously to Example 20, there is produced in a 11% yield, $\Delta^{5(10)}$-estrene-3$\beta$,17$\beta$-diol by fermentation with *Rhodotorula mucilaginosa* (NCYC 63).

EXAMPLE 22

Under the conditions described in Example 20, there is produced, in a 67% yield, $\Delta^{5(10)}$-estrene-3$\beta$,17$\beta$-diol by fermentation with *Pichia fermentans* (NCYC 246).

EXAMPLE 23

Under the conditions given in Example 20, there is produced, in a 40% yield, $\Delta^{5(10)}$-estrene-3$\beta$,17$\beta$-diol by fermentation with *Candida krusei* (ATCC 6258).

EXAMPLE 24

Under the conditions described in Example 20, there is produced 17$\alpha$-methyl-$\Delta^{5(10)}$-estrene-3$\beta$,17$\beta$-diol (melting point 161–163° C.) by fermentation of 17$\alpha$-methyl-$\Delta^{2,5(10)}$-estradiene-3,17$\beta$-diol-3-methylether.

EXAMPLE 25

Under the conditions given in Example 20, there is produced 17$\alpha$-ethinyl-$\Delta^{5(10)}$-estrene - 3$\beta$,17$\beta$ - diol, having a melting point of 133–135° C., by fermentation of 17$\alpha$-ethinyl-$\Delta^{2,5(10)}$-estradiene 3,17$\beta$-diol-3-methylether.

EXAMPLE 26

Analogously to Example 20, 18-methyl-$\Delta^{5(10)}$-estrene-3$\beta$,17$\beta$-diol is produced by fermentation of 18-methyl-$\Delta^{2,5(10)}$-estradiene-3,17-diol-3-methylether. In an analogous manner, the fermentation will proceed using *Pichia fermentans* (NCYC 246).

EXAMPLE 27

Under the conditions given in Example 20, $\Delta^{5(10)}$-estrene - 3$\beta$ - ol - 17 - on is produced by fermentation of $\Delta^{2,5(10)}$-esterdiene-3-ol-17-on-3-methylether. In addition, there is also obtained $\Delta^{5(10)}$-estrene-3$\beta$,17$\beta$-diol.

EXAMPLE 28

Under the conditions given in Example 20, 7$\alpha$-methyl-$\Delta^{5(10)}$-estrene-3$\beta$,17$\beta$-diol, having a melting point of 158–159° C., is obtained by fermentation of 7$\alpha$ - methyl-$\Delta^{2,5(10)}$-estradiene-3,17$\beta$-diol-3-methylether with *Candida tropicalis* St. Monilia H.

EXAMPLE 29

Under the conditions given in Example 20, $\Delta^{5(10)}$-estrene-3$\beta$,16$\alpha$,17$\beta$-triol, having a melting point of 203–205° C., is obtained by fermentation of $\Delta^{2,5(10)}$-estradiene-3,16$\alpha$,17$\beta$-triol-3-methylether with *Candida tropicalis* St. Monilia H.

EXAMPLE 30

Under the conditions given in Example 20, $\Delta^{5(10)}$-estrene-3-$\beta$,17$\beta$-diol, having a melting point of 146–148° C., is obtained by fermentation of $\Delta^{2,5(10)}$-estradiene-3,17$\beta$-diol-3-ethylether using *Candida tropicalis* St. Monilia H.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of producing 3$\beta$-hydroxy-$\Delta^{5(10)}$-steroids of the pregnane and androstane series, comprising the step of subjecting a 3-keto-$\Delta^{5(10)}$-steroid or 3$\beta$-lower alkoxy-$\Delta^{2,5(10)}$-steroid of the pregnane or androstane series to reaction with a microorganism selected from the group consisting of fungi, yeasts, bacteria of the genus Bacillus, bacteria of the genus Flavobacterium and bacteria of the genus Proteus, followed by isolation of the 3$\beta$-hydroxy-$\Delta^{5(10)}$-steroid.

2. A method as defined in claim 1, wherein said 3-keto- or 3$\beta$-lower alkoxy-$\Delta^{2,5(10)}$-steroids of the pregnane and androstane series are substituted in at least one of the 6-, 11-, 16-, 17-, 20- and 21-positions with a free or esterified hydroxyl group, and in at least one of the 6-, 7-, 16-, 17- and 18-positions with an alkyl group and optionally may be further substituted in 17-position with an ethylene group, in 17- or 20-position with a keto group, and in 16,17-position with a cyclomethylene residue.

3. A method as defined in claim 2, wherein said hydroxyl group is a free hydroxyl group.

4. A method as defined in claim 2, wherein said alkyl group is a lower alkyl group having between 1 and 5 carbon atoms.

5. A method as defined in claim 1, wherein said lower alkoxy is methoxy or ethoxy.

6. A method as defined in claim 1, wherein said microorganisms are bacteria selected from the group consisting of *Bacillus esterificans*, *Bacillus laterosporus*, *Flavobacterium arborescens*, *Flavobacterium flavescens*, *Flavobacterium suaveolens* and *Proteus vulgaris*.

7. A method as defined in claim 1, wherein said microorganism is a yeast selected from the group consisting of Candida, Rhodotorula and Pichia.

8. A method as defined in claim 1, wherein said microorganism is a fungus selected from the group consisting of *Aspergillus fischeri, Clastosporium maydicum, Cylindrocarpon radicicola, Dothichiza feroginosa, Gibberella cyanea, Fusarium javanicum, Fusarium solani, Melanconium sacchari, Penicillium albidum, Penicillium digitatum, Penicillium notatum, Phyllosticta sojaecola, Septomyxa affinis* and *Sporidesmium bakeri.*

9. A method as defined in claim 1, wherein said microorganism is yeast selected from the group consisting of *Candida albicans, Candida brumptii, Candida guilliermondii, Candida krusei, Candida claussenii, Candida melibiosi, Candida mycoderma, Candida pelliculosa, Candida pulcherrima, Candida reukaufii, Candida rugosa, Candida scottii, Candida stellatoidea, Candida tropicalis, Candida tropicalis St. Monilia H, Candida zeylanoides, Debariomyces kloeckeri, Pichia fermentans, Rhodotorula glutinis* var. *gracilis St. Reindl, Rhodotorula glutinis* var. *rubescens, Rhodotorula graminis, Rhodotorula minuta, Rhodotorula mucilaginosa* and *Rhodotorula rubra.*

References Cited

UNITED STATES PATENTS

| | | | |
|---|---|---|---|
| 2,796,382 | 6/1957 | Talalay | 195—51 |
| 2,844,513 | 7/1958 | Wettstein | 195—51 |
| 3,386,890 | 6/1968 | Vezina et al. | 195—51(A3135) |

ALVIN E. TANENHOLTZ, Primary Examiner

U.S. Cl. X.R.

260—397.4